Feb. 8, 1966  B. F. COSKI  3,233,933
DUAL CAPACITY CHAIN HOOKS

Filed Nov. 13, 1963  2 Sheets-Sheet 1

INVENTOR.
BERNARD F. COSKI
BY Mathis & Graybeal

INVENTOR.
BERNARD F. COSKI
BY Mathis & Graybeal

United States Patent Office 3,233,933
Patented Feb. 8, 1966

3,233,933
DUAL CAPACITY CHAIN HOOKS
Bernard F. Coski, 2311 Ross Way, Tacoma, Wash.
Filed Nov. 13, 1963, Ser. No. 323,462
2 Claims. (Cl. 294—74)

The present invention relates to chain hooks and the like, and more particularly to the provision of a twin prong chain hook, usable as either a "grab hook" or a "choker hook."

Known conventional "grab hooks" are characterized by a single arcuate prong or tine and a relatively narrow throat. The throat is sized to receive and accommodate the narrower transverse dimension of a chain link, but to prevent passage therethrough of the wider transverse dimension of the next chain link. In use the conventional "grab hook" is attached to a chain by engaging a link of such chain sideways in the hook throat. As tension is put in the chain the rounded end portion of the link adjacent to the link accommodated in the hook throat makes surface-to-surface contact with side surface portions of the hook disposed on opposite sides of the hook throat. In installations wherein a conventional grab hook is used to couple together two lengths of chain, hook-to-link contact is made at a location that is laterally offset to one side of the line of pull, creating a bending moment tending to deform both the hook and the engaged chain link.

A "choker hook," as herein defined, is a hook having an enlarged throat of sufficient size to loosely accommodate even the wider transverse dimension of the links of a chain with which it is employed. In use, a "choker hook" is engaged sideways over a section of the chain and may be allowed to slide relative to the chain in similar fashion as a slip knot slides relative to a rope.

The principal object of the present invention is to provide a chain hook that, owing to its unique construction, is capable of functioning in either a "grab hook" or a "choker hook" capacity. In brief, the chain hook of the present invention comprises a pair of laterally spaced arcuate tines or prongs stemming from a common shank and together forming a relatively narrow cleft and forming with said shank an enlarged hook throat. In use as a "grab hook" one link of a chain is inserted into the cleft and the rounded end portion of an adjacent link is "grabbed" and held by the inboard edge surfaces of the tines or prongs much like the claws of a hammer "grab" and hold the head of a nail. When used as a "choker hook" both prongs are hooked crosswise over a portion of the chain, placing such portion of the chain in the enlarged throat of the hook. As will be evident the chain herein referred to is conventional and consists of a plurality of successively joined oval links, each encircling a portion of the next link. Such chain may be referred to as a standard oval link chain.

As an additional characteristic, feature, and advantage of the chain hook of the present invention, the outboard side surfaces of the tines are convexly arcuate and together give the hook a rounded arch lateral cross-section at the bights (i.e. at the "saddle" of the hook throat) of the tines, extending from one outboard corner of one tine, across the tops of the tines, and then down to the outboard corner of the other tine, interrupted only by the cleft. The significance of this structural feature is that it provides a "rounded" support for the chain when the hook is used as a "choker hook." Additionally, in the saddle region of the hook throat, in the vicinity of the cleft, the corners formed by the intersection of the inboard side surfaces of the tines or prongs with the inboard edge surface thereof are inwardly rounded or beveled and together form a "cradle" for the rounded end portion of the chain link engaged thereby when the hook is used in "grab hook" capacity. In the preferred form of the invention the inboard edge surfaces of the tines are rounded; they interconnect the inboard and outboard side surfaces of the tines; and together they form the said "cradle."

Another object of the present invention is to provide a combination "grab hook" and "choker hook" that is of one piece integral construction, and is configured to include cleft and cradle portions that constitute the principal functioning parts of the hook when the same is employed in a "grab hook" capacity, but which do not interfere with the use of said hook in a "choker hook" capacity, and which hook further includes an enlarged throat and a laterally oriented, arch shaped chain support that constitute the principal functioning parts of the hook when the same is employed as a "choker hook" but which do not interfere with the use of said hook as a "grab hook."

A further object of the present invention is to provide an improved "grab hook," especially adapted to engage the rounded end portion of a chain link in a manner such that surface-to-surface contact between the hook and said link is symmetrically related to the line of pull.

A still further object of the present invention is to provide a chain hook characterized by a one-piece integral construction and capable of withstanding long periods of rugged and heavy duty use, such hook being further characterized by a generally annular shaped eye having front and rear side surfaces that are substantially right-angularly related to the plane of symmetry of the hook, and a relatively flat and thin shank having a relatively narrow neck connected to said eye and a relatively wide base distal of said eye, said shank also being substantially right angularly related to said plane of symmetry of the hook, and said shank preferably widening gradually from its neck to its base, with the base of the shank being substantially wider than it is thick, and with the said tines or prongs of the hook extending outwardly from the base of said shank, generally parallel to and on opposite sides of the said plane of symmetry, the said tines or prongs being relatively deep in the bight portions thereof, and becoming progressively shallower as they approach their respective points.

An additional object of the present invention is to provide a hook of the character described wherein the throat surfaces (i.e. the front surface of the shank and the inboard edge surfaces of the tines) and the surfaces of the chain support (i.e. the outboard side surfaces of the tines) together and jointly present a surface configuration that is in the nature of or closely similar to a hyperbolic paraboloid $$\left(\frac{y^2}{b^2}-\frac{x^2}{a^2}=\frac{2}{c}\right)$$

These and other objects, features, advantages and characteristics of dual capacity chain hooks according to the present invention will be apparent from the foregoing typical and therefore non-limitive embodiments of such hooks, as discussed below in conjunction with the accompanying illustrations thereof, wherein like numerals refer to like parts, and wherein.

Figure 1:
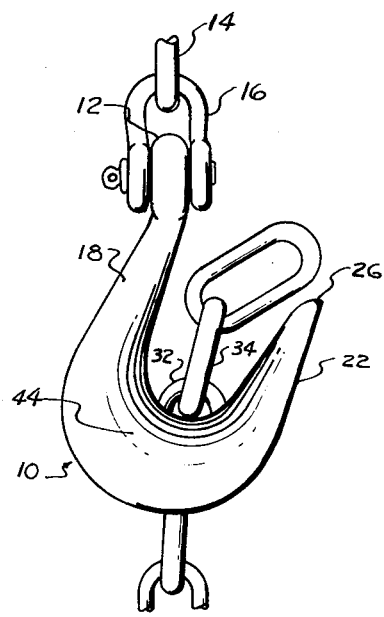
FIG. 1 is a side elevational view of the dual capacity chain hook of the present invention, used in the capacity of a "grab hook," wherein the rounded end portion of a chain link is engaged and held by a cradle formed by the laterally spaced tines of such hook, and an adjacent link is loosely accommodated by the cleft formed between said tines.
Figure 2:
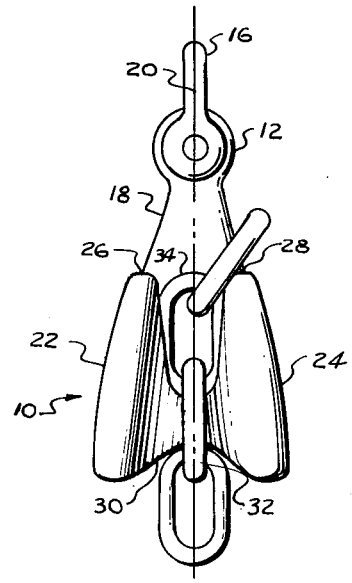
FIG. 2 is a front elevational view of the arrangement of FIG. 1, such view clearly showing the locations wherein surface-to-surface contact occurs between the tines of the hook and the rounded end portion of the chain link, and also clearly shows the loose accommodation of the adjacent chain link in the cleft of the hook.
Figure 3:
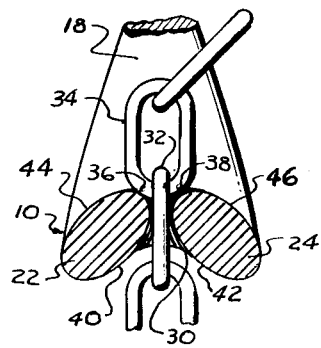
FIG. 3 is a sectional view taken laterally of the hook, through the tines, and showing the hook shank and chain in elevation.

Turning now to a more specific consideration of the typical embodiment of the invention illustrated by the drawings, FIGS. 1 and 2 are views, taken from different aspects of a typical use of a hook 10, constructed in accordance with the present invention, for joining together two lengths of chain. In such figures, the eye 12 is shown connected to the end link 14 of one of the lengths of chain by means of a conventional shackle 16, for example. The shank 18 of hook 10 is shown in FIG. 2 as widening gradually from a relatively narrow neck, integrally connected to the eye 12, to a relatively wide base, situated distal the eye 12. In FIG. 1, the shank 18 is depicted as being relatively thin throughout, but thicker at the base than in the neck. As is apparent from a comparison of FIGS. 1 and 3, the shank 18, at its base, is substantially wider than it is thick.

According to the invention, hook 10 is symmetrically constructed about a plane of symmetry, designated 20 in FIG. 2. A pair of laterally spaced, arcuate tines or prongs 22, 24 stem from the base of shank 18 and extend generally perpendicular to the face or front surface of said shank 18. As most clearly shown in FIG. 1, shank 18 and each of the tines 22, 24 combined to give the hook 10 a generally J-shaped profile configuration. The tines 22, 24 each constitute reverse bend elements approximating 150°–180° change in direction from the plane of the front surface or face of shank 18 to a plane generally tangent to the inner surfaces of the point portions 26, 28 of tines 22, 24, respectively.

As perhaps best shown in FIG. 2, tines 22, 24 are symmetrically related on opposite sides of the plane of symmetry 20 and form between themselves a cleft 30 sized to loosely accommodate the narrower transverse dimension of a chain link. In FIGS. 1 and 2 such a chain link 32 is shown accommodated in the cleft 30. Assuming, for example, that the length of chain of which link 32 is a part is attached at its lower end of an object to be lifted or moved, and the length of chain of which link 14 is a part is wrapped at its upper end around a power winch, for example, with said winch being operated so as to exert a pulling force on said latter mentioned length of chain, putting both lengths of chain and the hook 10 in tension. Owing to the unique construction of hook 10, the resultant of the tensile forces carried by hook 10 acts along a line that is located in the plane of symmetry 20, which line will hereinafter be referred to as the "line of pull." When the chain line, composed of the two lengths of chain and the hook 10, is first put in tension, link 32 tends to move longitudinally in cleft 30, relative to tines 22, 24 and away from eye 12. The movement that does occur is slight and proceeds only until the rounded loop end of link 34 contacts the inboard edge surfaces 36, 38 (see FIG. 3) of tines 22, 24, respectively. Such inboard edge surfaces 36, 38 together form what may be termed a "cradle" for the rounded loop end of chain link 34. Preferably, inboard edge surfaces 36, 38 are inwardly beveled and rounded, or, stated another way, such surfaces 36, 38 incline outwardly from where they intersect the inboard side surfaces 40, 42, of tines 22, 24, respectively, to where they intersect or merge into the respective outboard surfaces 44, 46 of tines 22, 24.

It should be noted that at least at the "saddle," or the low point of the hook throat, the inboard edge surfaces 36, 38 of tines 22, 24 may extend in planes that are generally parallel to the plane of symmetry 20 of the hook 10.

The preceding description of FIGS. 1 and 2 relates to the use of chain 10 as a "grab hook," wherein a selected single link, designated 34 in FIGS. 1 and 2, is literally "grabbed" and held by the tines 22, 24 of hook 10 in much the same way that the head of a nail is "grabbed" by the claws of a common claw hammer. Typical uses of the hook 10 of the present invention is the "grab hook" capacity include line-to-line connections, as previously described and "sling-chain" installations wherein both the eye 12 of the hook 10 and one end of a length of chain are attached to a line supported ring, and in use the said length of chain is looped around an object to be lifted, such as a section of pipe, a log, etc., and the terminal end thereof brought back to the hook 10 and a link inserted into the cleft 30 and the rounded end portion of the next adjacent link is engaged and retained by the said inboard edge surfaces 36, 38 of the tines 22, 24, in the previously described manner.

Figure 5:
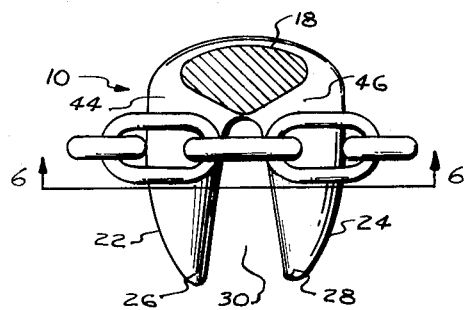
FIG. 5 is a view of the arrangement of FIG. 3, taken partially in top plan and partially in section, with the sections being taken through the shank of the hook substantially along line 5—5 of FIG. 4.
Figure 6:
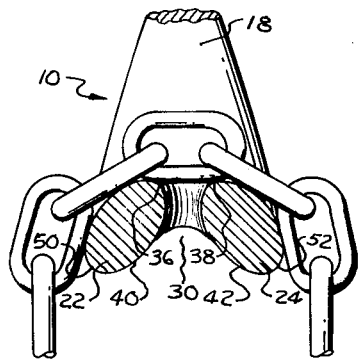
FIG. 6 is another view of the arrangement of FIG. 3, taken partially in front elevation and partially in section, with the section being taken transversely through the tine, substantially along line 6—6 of FIG. 5.

In reference to FIGS. 4–6, the "choker hook" capacity of hook 10 will now be described. The throat 48 of hook 10 is defined partly by the face of the shank 18 and partly by the inboard edge surfaces 36, 38 of the tines 22, 24, and also partly by the said outboard side surfaces 44, 46 of the tines 22, 24. As best shown in FIG. 6, across the tines 22, 24 the hook 10 is transversely arcuate, forming a "rounded" support for the chain. Commencing from the outboard corner 50 of tine 22 and extending upwardly and over tine 22, and over and down tine 24 to the outboard corner 52 of tine 24, the said outboard side surfaces 44, 46 of the tines 22, 24 together form a generally arch-shaped surface configuration interrupted only by the cleft 30. As is obvious from FIG. 6, for example, the chords of the arcuate outboard side surfaces 44, 46 incline inwardly from the bottom to the top of hook 10. Together the several surfaces forming the hook throat and the chain support, i.e. the face of shank 18, the outboard side surface 40, 42 of tines 22, 24, and the upper edge surfaces of tines 22, 24, form a major segment of a surface configuration that is in the nature of a hyperbolic paraboloid, and which of course is interrupted by the cleft 30.

Figure 4:
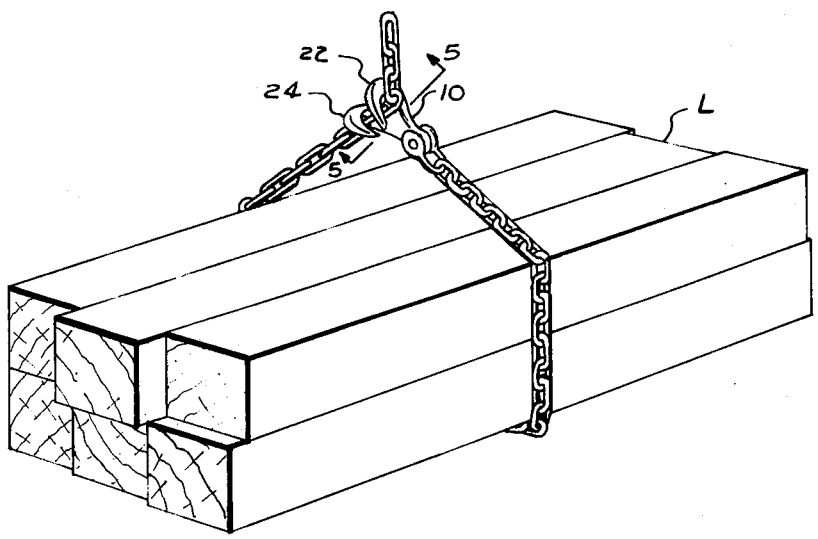
FIG. 4 is a perspective view looking down onto the chain hook of the present invention and illustrating a typical application of the same in the capacity of a "choker hook"; wherein a portion of the chain is positioned in the throat of the hook, formed by the hook shank and both tines.

Referring now to FIG. 4, a chain is shown wrapped around a plurality of timbers representing a typical load L. The chain hook 10, shown attached to the free end of said chain, has both of its tines 22, 24 hooked crosswise over an intermediate portion of the chain. Owing to the enlarged hook throat, the hook 10 is free to slide relatively along the chain in similar fashion as a slipknot slides relative to rope, until, of course, such movement is prevented by the load L. Owing to the rounded transverse chain support, the loading of the chain by the hook 10 is spread out over a plurality of chain links, and the forces are somewhat evenly distributed along the links.

Figure 7:
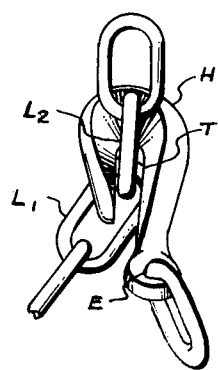
FIG. 7 is a perspective view looking generally down on a conventional, single prong, grab hook, in a typical in use position, with a chain link engaged in the throat of such hook.

FIG. 7 illustrates a conventional, single prong, grab hook employed to couple a chain to itself, which chain surrounds a load in similar fashion to the chain illustrated by FIG. 4. In FIG. 7 the conventional chain hook H is illustrated as having an eye E that is located in the plane of the hook shank and the single tine. The hook throat T is relatively narrow and sized to loosely accommodate the narrower transverse dimension of a chain link, but to prevent the passage therethrough of the wider transverse dimension of the chain link. In FIG. 7 the chain link $L_2$ is shown accommodated in the hook throat T while an adjacent link $L_1$, substantially right angularly related to link $L_2$, is illustrated in surface-to-surface contact with a side face of the hook H.

It is obvious from FIG. 6 that in installations wherein the conventional, single prong, grab hook H is used to couple together the ends of two lengths of chain in tension and extending generally in a straight line, the contact of the rounded end portion of chain link $L_1$ with the side surface of hook H occurs at a location offset to one side of the line of pull. In this situation the hook H is pulled in one direction and the chain length of which link $L_1$ is a part is pulled in the opposite direction and this tends to straighten out both chain link $L_2$ and hook H with respect to the line of pull and to locate the point of contact of hook H with chain link $L_1$ within the line of pull. This straightening tendency is resisted by internal moments in both the hook H and in chain link $L_2$. As thus loaded, the tendency is for both the hook H and chain link $L_2$ to bend and be deformed. Under heavy-duty use of the hook H such deformation is likely to occur because both hook H and chain link $L_1$ have their narrowest dimensions oriented in the direction of bending and consequently have a smaller section modulous available for resistant bending. Due to the unique construction of the chain hook 10 of the present invention, this situation does not occur. As previously described, in installations involving the use of hook 10 of the present invention as a "grab hook," the surface-to-surface contact between the hook 10 and the chain link 34 (FIG. 3) is symmetrically related to the line of pull and the forces involved have a result acting in the line of pull.

Additional uses of the dual capacity, twin prong chain hook of the present invention, include being used as the hook component of a load binding assembly, such assembly being known more simply as a "load binder." In such assembly the hook 10 of the present invention would be employed in its "grab hook" capacity.

From the foregoing, various other adaptations, modifications, and modes of utilization of the dual capacity, twin prong, chain hook, characteristic of the invention will be apparent to those skilled in the art to which the invention is addressed. It is to be understood that the invention is to be limited solely by the scope of the pended claims, rather than by the specific details presented by the illustrative form and the foregoing description.

What is claimed is:

1. A chain hook selectively usable as either a grab hook or a choker hook, said chain hook comprising: a pair of laterally spaced, arcuate tines stemming from a common shank and defining a cleft between them, said tines each including a point portion, a bight portion interconnecting between said point portion and the common shank, a sharply rounded inboard edge bordering the cleft, and an outboard side surface of relatively flat curvature, the cord of which inclines inwardly, with the sharply rounded inboard edges of the tines together forming a cradle for engaging and holding the end portion of a chain link when the hook is used in a grab hook capacity, with the outboard side surfaces of the tines, together forming a transverse chain seat of a shallow, rounded arch form, extending across both tines and being interrupted only by the cleft, for supporting a plurality of successively joined chain links when the chain is used in a choker hook capacity, and with the common shank and the bight and point portions of the tines together forming a hook throat of rounded arch form of a size large enough to loosely accommodate the wider transverse dimension of the chain links supported by the transverse chain seat when the hook is used in a choker hook capacity.

2. A chain hook selectively usable as either a grab hook or a choker hook, said chain hook comprising: a generally annular eye, an elongated shank connected to and extending away from said eye, said shank having a relatively wide base distal said eye, and front and rear surfaces, a pair of laterally spaced, arcuate tines stemming from said base, generally perpendicularly to the front surface of said shank, and defining a cleft between them, said tines each including a point portion, a bight portion interconnecting between said point portion and the shank, a sharply rounded inboard edge bordering the cleft, and an outboard side surface of relatively flat curvature, the cord of which inclines inwardly, with the sharply rounded inboard edges of the tines together forming a cradle for engaging and holding the end portion of a chain link when the hook is used in a grab hook capacity, with the outboard side surfaces of the tines together forming a transverse chain seat of a shallow, rounded arch form, extending across both tines and being interrupted only by the cleft, for supporting a plurality of successively joined chain links when the chain is used in a choker hook capacity, with the shank and the bight and point portions of the tines together forming a hook throat that is sized large enough to loosely accommodate the wider transverse dimension of the chain links supported by the transverse chain seat when the hook is used in a choker hook capacity, and with the front surface of the shank merging into the outboard surfaces of the tines, and forming therewith, and with the inner surface portions of the point portions of the tines, a surface configuration that is in the nature of a hyperbolic paraboloid, interrupted by the cleft.

References Cited by the Examiner
UNITED STATES PATENTS 1,224,148 5/1917 Crosby.

FOREIGN PATENTS 521,816 10/1953 Belgium.

GERALD M. FORLENZA, *Primary Examiner.*

SAMUEL F. COLEMAN, *Examiner.*